(12) United States Patent
Takahashi et al.

(10) Patent No.: US 11,381,137 B2
(45) Date of Patent: Jul. 5, 2022

(54) ELECTRIC MOTOR, COMPRESSOR, AIR CONDITIONER, AND METHOD FOR MANUFACTURING ELECTRIC MOTOR

(71) Applicant: Mitsubishi Electric Corporation, Tokyo (JP)

(72) Inventors: Ryogo Takahashi, Tokyo (JP); Hiroki Aso, Tokyo (JP); Takanori Watanabe, Tokyo (JP); Takaya Shimokawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 156 days.

(21) Appl. No.: 16/605,686

(22) PCT Filed: Jun. 20, 2017

(86) PCT No.: PCT/JP2017/022658
§ 371 (c)(1),
(2) Date: Oct. 16, 2019

(87) PCT Pub. No.: WO2018/235157
PCT Pub. Date: Dec. 27, 2018

(65) Prior Publication Data
US 2020/0119621 A1    Apr. 16, 2020

(51) Int. Cl.
H02K 9/22      (2006.01)
H02K 5/18      (2006.01)
H02K 15/12     (2006.01)
H02K 15/14     (2006.01)
F24F 1/0007    (2019.01)
F04D 25/08     (2006.01)
F24F 1/08      (2011.01)

(52) U.S. Cl.
CPC ............... *H02K 9/22* (2013.01); *H02K 5/18* (2013.01); *H02K 15/12* (2013.01); *H02K 15/14* (2013.01); *F04D 25/082* (2013.01); *F24F 1/00073* (2019.02); *F24F 1/08* (2013.01)

(58) Field of Classification Search
CPC ............. H02K 9/22; H02K 5/18; H02K 15/12
USPC .............................................. 310/43, 64, 66
See application file for complete search history.

(56) References Cited

U.S. PATENT DOCUMENTS 5,789,833 A      8/1998  Kinoshita et al.
2001/0017498 A1  8/2001  Matsuoka et al.
2010/0126703 A1  5/2010  Ruan et al.
(Continued)

FOREIGN PATENT DOCUMENTS

| CN | 102150348 A | 8/2011 |
| CN | 103348138 A | 10/2013 |
| EP | 2 325 983 A1 | 5/2011 |

(Continued)

OTHER PUBLICATIONS

Machine Translation JP08098441 (Year: 1996).*
(Continued)

*Primary Examiner* — Jose A Gonzalez Quinones
(74) *Attorney, Agent, or Firm* — Posz Law Group, PLC

(57) ABSTRACT

An electric motor includes a stator assembly, a rotor provided inside the stator assembly, and a heat sink to radiate heat from the stator assembly. The heat sink includes a base portion, and a heat radiating portion formed integrally with the base portion.

16 Claims, 14 Drawing Sheets

(56) References Cited

U.S. PATENT DOCUMENTS

| | | | |
|---|---|---|---|
| 2011/0018373 A1* | 1/2011 | Tian | .................... H02K 5/18 |
| | | | 310/61 |
| 2013/0119834 A1 | 5/2013 | Nakagami et al. | |

FOREIGN PATENT DOCUMENTS

| | | | | |
|---|---|---|---|---|
| EP | 2325983 | A1 | | 5/2011 |
| EP | 2634427 | A1 | | 9/2013 |
| JP | 04312337 | A | * | 11/1992 |
| JP | 08098441 | A | * | 4/1996 |
| JP | H08-298762 | A | | 11/1996 |
| JP | H09-205758 | A | | 8/1997 |
| JP | H09-252563 | A | | 9/1997 |
| JP | 2001-327152 | A | | 11/2001 |
| JP | 2002-027708 | A | | 1/2002 |
| JP | 2007-267568 | A | | 10/2007 |
| JP | 2007267568 | A | * | 10/2007 |
| JP | 2009121127 | A | * | 6/2009 |
| JP | 2010022192 | A | * | 1/2010 |
| JP | 2012-092747 | A | | 5/2012 |
| JP | 2012-174734 | A | | 9/2012 |
| JP | 2017169348 | A | * | 9/2017 |
| WO | 2010/029623 | A1 | | 3/2010 |
| WO | WO-2018061111 | A1 | * | 4/2018 ............... H02K 5/18 |

OTHER PUBLICATIONS

International Search Report of the International Searching Authority dated Sep. 5, 2017 for the corresponding International application No. PCT/JP2017/022658 (and English translation).

Japanese Reconsideration Report by Examiner before Appeal dated Feb. 24, 2021, issued in corresponding JP Patent Application No. 2019-524743 (and English Machine Translation).

Office Action dated Apr. 28, 2020 issued in corresponding JP patent application No. 2019-524743 (and English translation).

Office Action dated Dec. 2, 2020 issued in corresponding CN patent application No. 201780090977.9 (and English translation).

Office Action dated Sep. 7, 2021 in corresponding JP Application No. 2019-524743(and English Machine Translation).

Office Action dated Nov. 10, 2020 issued in corresponding JP patent application No. 2019-524743 (and English translation).

Office Action dated Jul. 7, 2021 in corresponding CN Application No. 201780090977.9 (and English Machine Translation).

* cited by examiner

ELECTRIC MOTOR, COMPRESSOR, AIR CONDITIONER, AND METHOD FOR MANUFACTURING ELECTRIC MOTOR

CROSS REFERENCE TO RELATED APPLICATION

This application is a U.S. national stage application of International Patent Application No. PCT/JP2017/022658 filed on Jun. 20, 2017, the disclosure of which is incorporated herein by reference.

TECHNICAL FIELD

The present invention relates to an electric motor including a heat sink.

BACKGROUND

It is a common practice to use a heat sink as a heat radiating member to radiate heat from an electric motor outside. An electric motor including a U-shaped heat sink, for example, has been proposed (see, for example, patent reference 1).

PATENT REFERENCE

Patent Reference 1: Japanese Patent Application Publication No. H8-298762

A problem has arisen, however, in that the heat sink disclosed in patent reference 1 has a U shape, and its machining is therefore complicated. As another problem, the heat sink disclosed in patent reference 1 is covered with a resin, and this lowers the heat radiation efficiency.

SUMMARY

It is an object of the present invention to enhance the heat radiation efficiency in the electric motor.

An electric motor according to an aspect of the present invention includes a stator assembly including a resin, a rotor provided inside the stator assembly, and a heat sink fixed to the stator assembly and to radiate heat from the stator assembly. The heat sink includes a base portion fitting into the resin, and a heat radiating portion formed integrally with the base portion.

According to the present invention, the heat radiation efficiency in the electric motor can be enhanced.

BRIEF DESCRIPTION OF THE DRAWINGS

FIG. 6b is a sectional view taken along a line 6b-6b illustrated in FIG. 6a.

FIG. 9b is a sectional view taken along a line 9b-9b illustrated in FIG. 9a.

FIG. 10b is a sectional view taken along a line 10b-10b illustrated in FIG. 10a.

FIG. 12b is a sectional view taken along a line 12b-12b illustrated in FIG. 12a.

DETAILED DESCRIPTION

Embodiment 1

An electric motor 1 according to Embodiment 1 of the present invention will be described below.

In an x-y-z orthogonal coordinate system illustrated in each drawing, the z-direction (z-axis) indicates a direction (to be also referred to as the "axial direction of a rotor 2" or simply as the "axial direction" hereinafter) parallel to an axis A1 (that is, the axis of rotation of the rotor 2) of a shaft 22 of the electric motor 1, the x-direction (x-axis) indicates a direction perpendicular to the z-direction, and the y-direction indicates a direction perpendicular to both the n- and x-directions.

Figure 1:
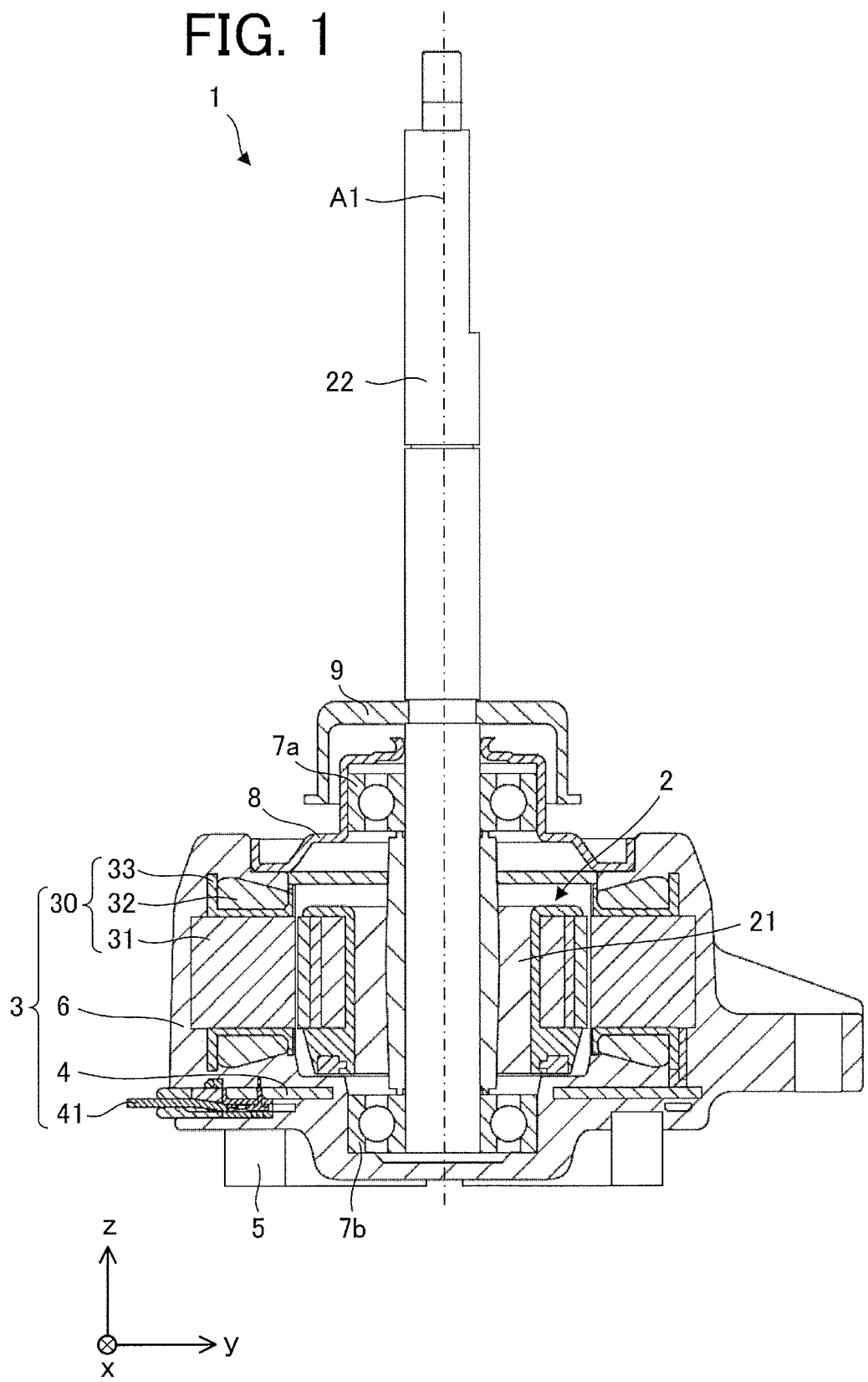
FIG. 1 is a sectional view schematically illustrating a structure of an electric motor according to Embodiment 1 of the present invention.

FIG. 1 is a sectional view schematically illustrating a structure of the electric motor 1 according to Embodiment 1 of the present invention.

Figure 2:
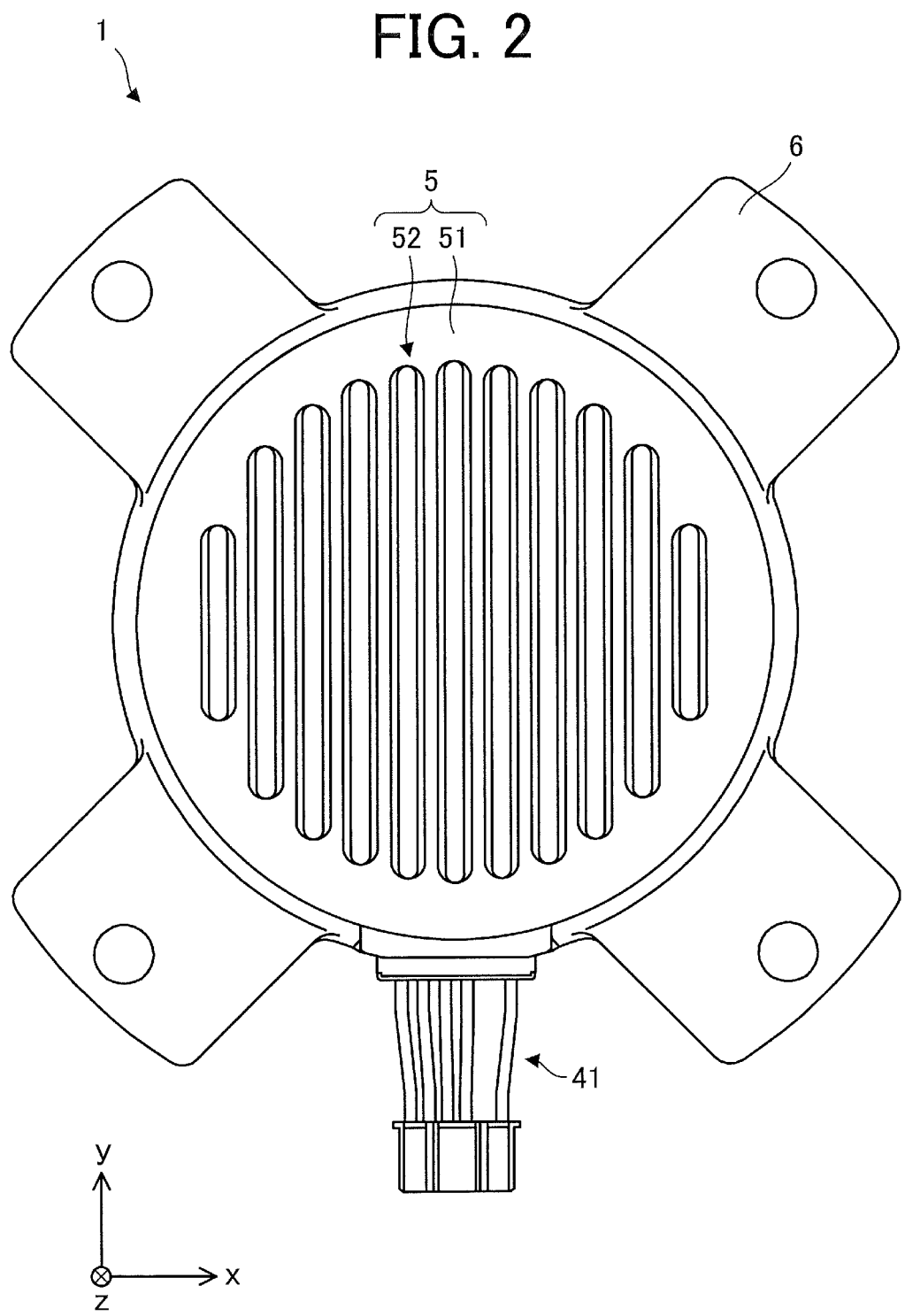
FIG. 2 is a front view schematically illustrating a structure of the electric motor.

FIG. 2 is a front view schematically illustrating the structure of the electric motor 1.

Figure 3:
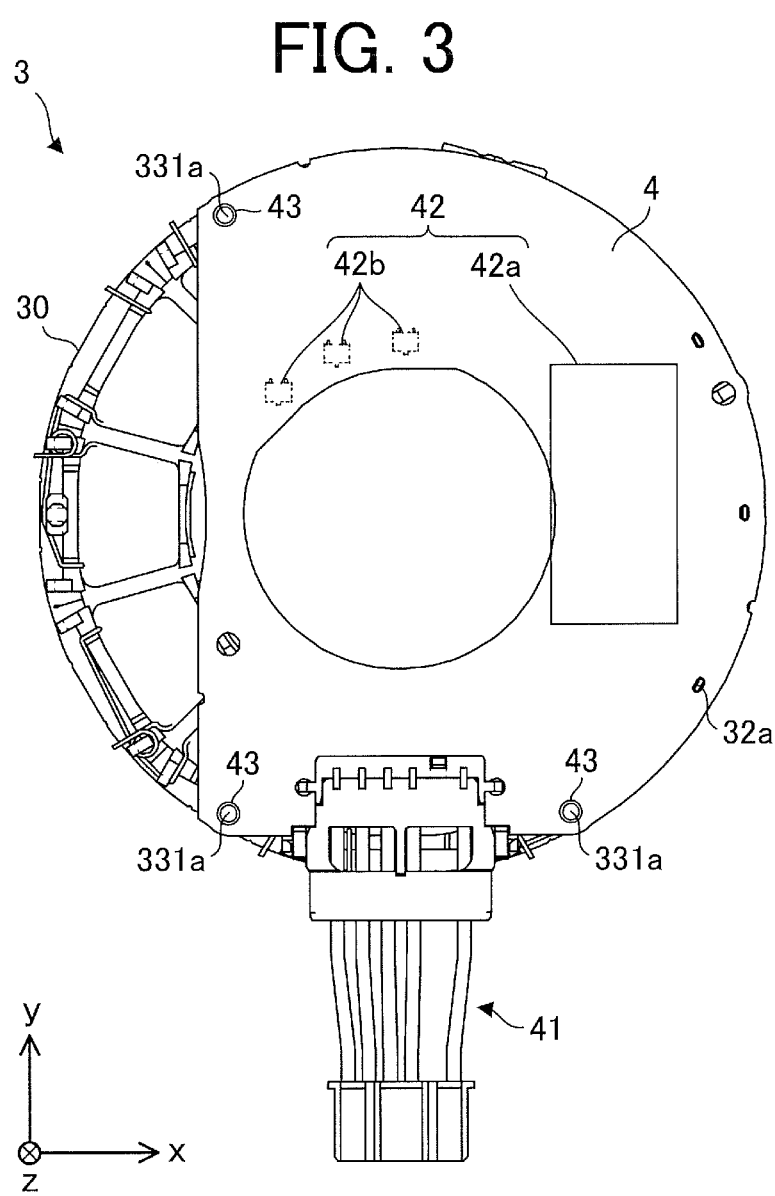
FIG. 3 is a front view schematically illustrating a structure of a stator assembly.

FIG. 3 is a front view schematically illustrating a structure of a stator assembly 3. Note that the stator assembly 3 illustrated in FIG. 3 is in a state before molding of a resin 6.

The electric motor 1 (also called a molded electric motor) includes the rotor 2 (also called a rotor assembly), the stator assembly 3 (also called a molded stator), a heat sink 5 as a heat radiating member, and bearings 7a and 7b. In the example illustrated in FIG. 1, the electric motor 1 further includes a bracket 8, and waterproof rubber 9 to seal the electric motor 1. The electric motor 1 is, for example, a permanent magnet synchronous motor, but the electric motor 1 is not limited to this. The bearings 7a and 7b rotatably support opposite ends of the shaft 22 of the rotor 2.

The rotor 2 includes a rotor core 21 and the shaft 22. The rotor 2 is free to rotate about the axis of rotation (that is, the axis A1). The rotor 2 is rotatably provided inside the stator assembly 3 (more specifically, a stator 30) with a gap in between. The rotor 2 may further include a permanent magnet for forming magnetic poles on the rotor 2.

The stator assembly 3 includes the stator 30, a printed circuit board 4, a lead wire 41 connected to the printed circuit board 4, a driving circuit 42 fixed to a surface of the printed circuit board 4, and the resin 6 (also called a molded resin).

Figure 4:
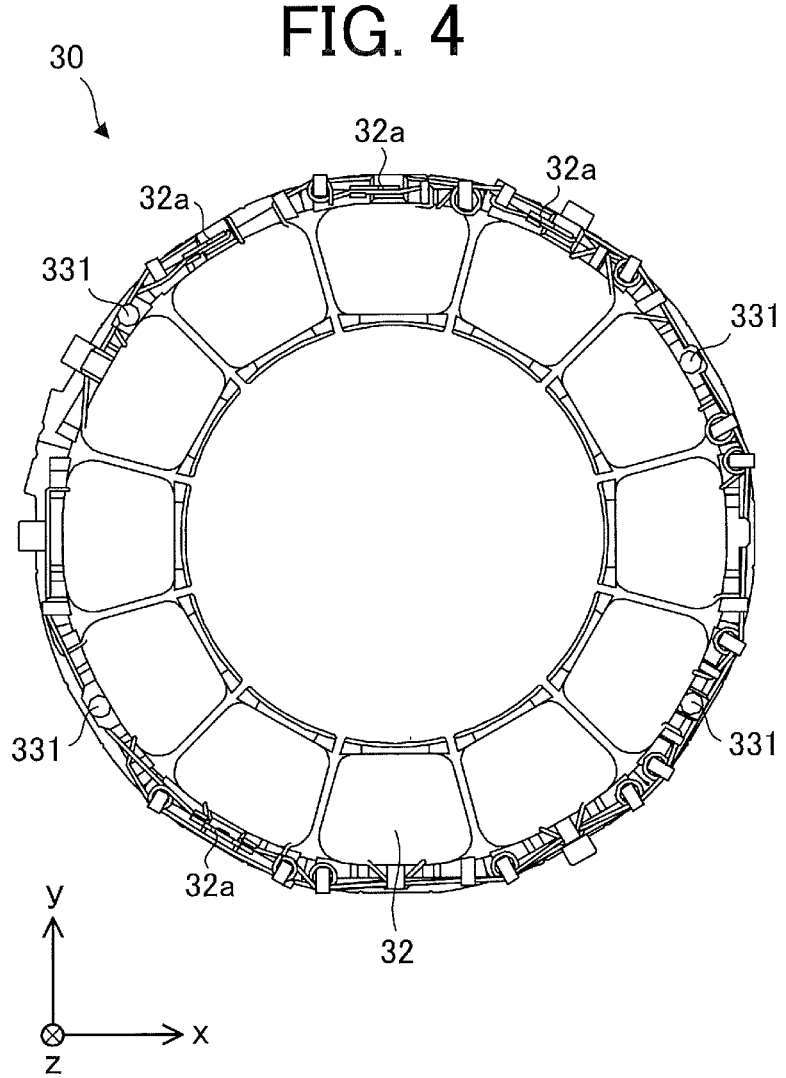
FIG. 4 is a front view schematically illustrating a structure of a stator.

FIG. 4 is a front view schematically illustrating a structure of the stator 30.

Figure 5:
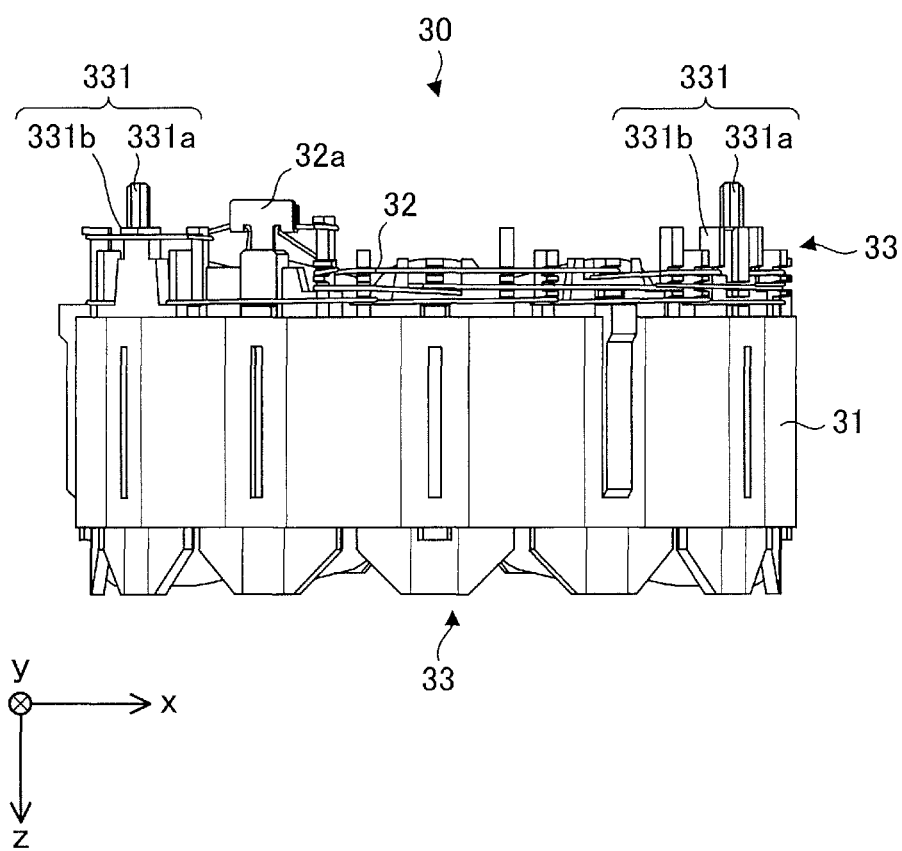
FIG. 5 is a side view schematically illustrating the structure of the stator.

FIG. 5 is a side view schematically illustrating the structure of the stator 30.

The stator 30 includes a stator core 31 having a plurality of electrical steel sheets stacked in the axial direction, a winding 32 (also called a stator winding), and an insulator 33 as an insulating portion. The plurality of electrical steel sheets are each formed into a predetermined shape by stamping processing, and are fastened together by caulking, welding, bonding, and so on.

The winding 32 is, for example, a magnet wire. The winding 32 is wound around the insulator 33 combined with the stator core 31 to form a coil. The winding 32 is electrically connected to a terminal 32a (winding terminal). In the example illustrated in FIG. 5, the end of the winding 32 is hung on a hook portion of the terminal 32a, and fixed to the terminal 32a by, for example, fusing or soldering. The terminal 32a is fixed to the insulator 33, and electrically connected to the printed circuit board 4.

The insulator 33 includes at least one fixing portion 331 to fix the printed circuit board 4. The insulator 33 is, for example, a thermoplastic resin such as Polybutylene Terephthalate (PBT). The insulator 33 electrically insulates the stator core 31 (for example, a tooth portion of the stator core 31). The insulator 33 is, for example, molded integrally with the stator core 31. However, the insulator 33 may be molded in advance, and the molded insulator 33 may be combined with the stator core 31.

The printed circuit board 4 includes a positioning hole 43 (also simply called a "hole") to engage with the fixing portion 331 (more specifically, a protrusion 331a) of the insulator 33.

The fixing portion 331 of the insulator 33 includes the protrusion 331a and a support portion 331b. The protrusion 331a is inserted into the positioning hole 43 formed in the printed circuit board 4 (FIG. 3). With this arrangement, the printed circuit board 4 is fixed to the insulator 33. The support portion 331b supports the printed circuit board 4 in the axial direction, and positions the printed circuit board 4 in the axial direction.

The printed circuit board 4 is integrated with the stator 30 by using the resin 6 (FIG. 1). The driving circuit 42 controls rotation of the rotor 2. The driving circuit 42 includes, for example, a driving element 42a and Hall ICs (Integrated Circuits) 42b.

The driving element 42a is, for example, a power transistor. The driving element 42a is electrically connected to the winding 32, and supplies, to the winding 32, a driving current based on a current supplied from the exterior or the interior (for example, a battery) of the electric motor 1. With this arrangement, the driving element 42a controls rotation of the rotor 2.

For example, the Hall ICs 42b detect the rotation position of the rotor 2 by detecting a magnetic field emanating from the rotor 2.

The resin 6 is, for example, a thermosetting resin such as BMC (Bulk Molding Compound). The BMC can be used for low-pressure molding and thus is suitable for insert molding. Hence, deformation of an insert object such as the printed circuit board 4 or the stator 30 can be prevented when the resin 6 is molded by using a mold, and the quality of the electric motor 1 can thus be improved.

The resin 6 may be a thermoplastic resin such as Polyphenylene Sulfide (PPS). The thermal conductivity of PPS improves in comparison to BMC, and therefore PPS allows heat from the stator assembly 3 to be readily transmitted to the heat sink 5. This makes it possible to improve the heat radiation performance of the electric motor 1 to keep down a rise in temperature of the printed circuit board 4 and the winding 32.

The heat sink 5 is formed by, for example, a metal material such as aluminum. In the example illustrated in FIG. 2, the outer shape (more specifically, the two-dimensional shape on the x-y plane) of the heat sink 5 is circular. A part (a base portion 51 to be described later) of the heat sink 5 fits into the resin 6 and consequently the heat sink 5 is integrated with the stator assembly 3 by using the resin 6.

The heat sink 5 is fixed to the stator assembly 3, and heat from the stator assembly 3 (for example, heat generated by the stator 30 or the driving circuit 42) is radiated out of the electric motor 1. A part (for example, a heat radiating portion 52 illustrated in FIG. 2) of the heat sink 5 is exposed outside the electric motor 1 (more specifically, the resin 6). With this arrangement, heat generated by the stator assembly 3 is radiated out of the electric motor 1.

The heat sink 5 may be in contact with the printed circuit board 4. When the heat sink 5 is in contact with the printed circuit board 4, heat from the printed circuit board 4 can be efficiently radiated out of the electric motor 1.

A heat radiation auxiliary member formed by a highly thermally conductive material may be disposed between the printed circuit board 4 and the heat sink 5. This makes it possible to efficiently radiate heat from the stator assembly 3 out of the electric motor 1. The heat radiation auxiliary member can be formed into, for example, a sheet or block shape.

Figure 6A:
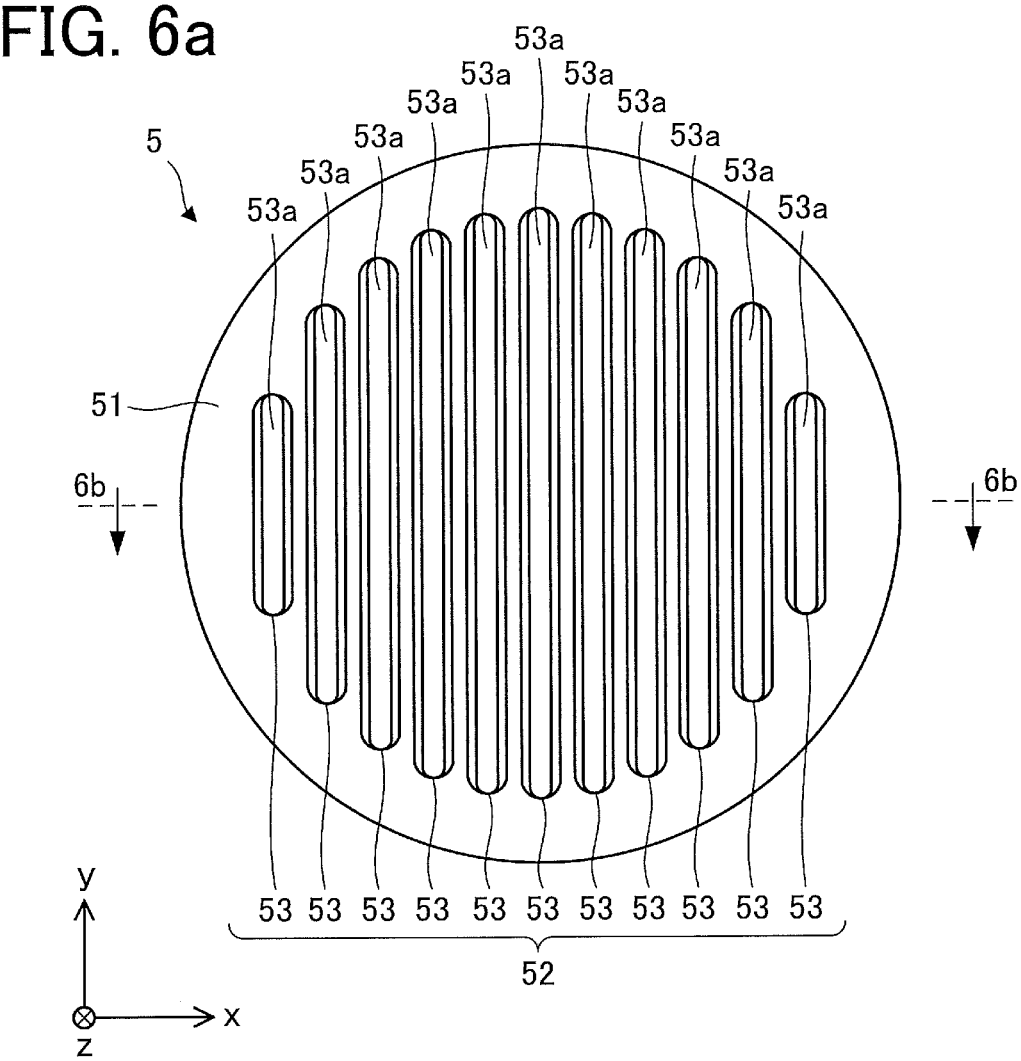
FIG. 6a is a plan view schematically illustrating an example of a heat sink.
Figure 6B:
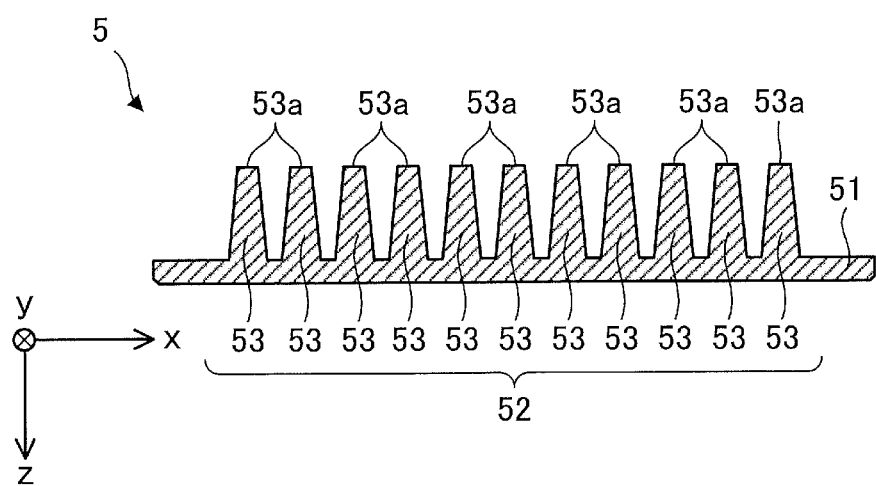

FIG. 6a is a plan view schematically illustrating an example of the heat sink 5, and FIG. 6b is a sectional view taken along a line 6b-6b illustrated in FIG. 6a.

The heat sink 5 includes a base portion 51, and a heat radiating portion 52 formed integrally with the base portion 51.

The base portion 51 is the outer edge of the heat sink 5, and has the width in the radial direction (to be also referred to as the "radial direction of the rotor 2" or simply as the "radial direction" hereinafter) of the heat sink 5. In the example illustrated in FIG. 6a, the outer shape (more specifically, the two-dimensional shape on the x-y plane) of the base portion 51 is circular. The heat radiating portion 52 is formed inside the base portion 51 in the radial direction. The heat radiating portion 52 includes a plurality of fins 53. Each fin 53 projects in the axial direction. The heat radiating portion 52 includes at least one heat radiating surface 53a. The heat radiating surface 53a forms the upper surface of each fin 53.

An example of a method for manufacturing the electric motor 1 will be described below.

Figure 7:
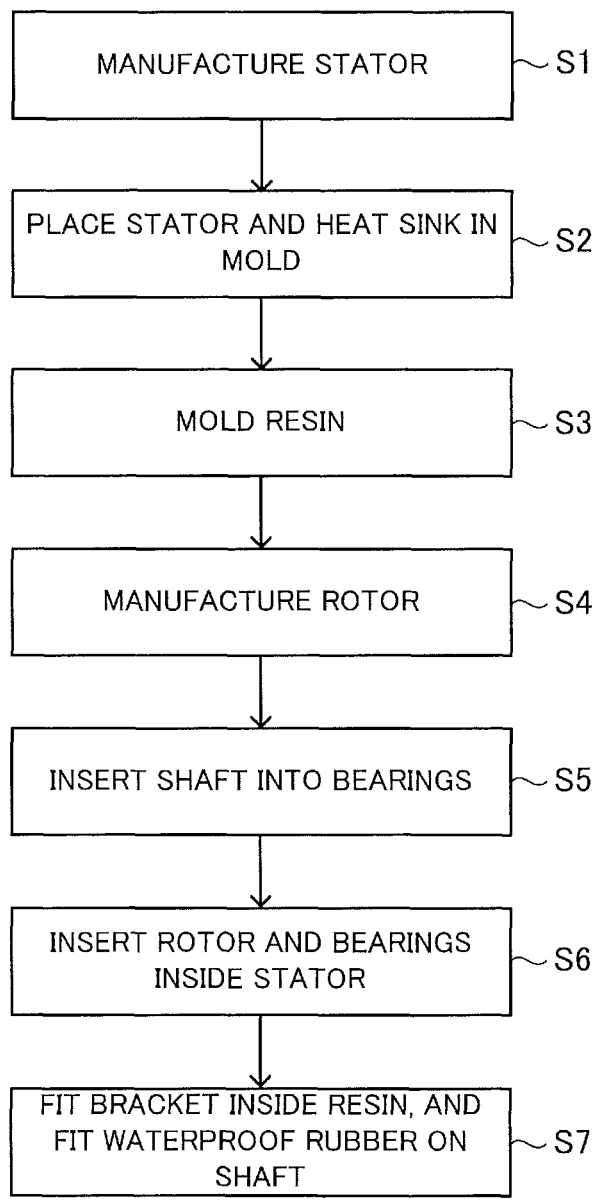
FIG. 7 is a flowchart illustrating an example of a process of manufacturing the electric motor.

FIG. 7 is a flowchart illustrating an example of a process of manufacturing the electric motor 1. The method for manufacturing the electric motor 1 includes the following steps.

In step S1, the stator 30 is manufactured. For example, the stator core 31 is formed by stacking the plurality of electrical steel sheets in the axial direction. The insulator 33 formed in advance is mounted on the stator core 31, and the winding 32 is wound around the stator core 31 and the insulator 33. The stator 30 is thus obtained. The protrusion 331a of the insulator 33 is inserted into the positioning hole 43 of the printed circuit board 4. The driving circuit 42 is fixed to the surface of the printed circuit board 4 in advance. The lead wire 41 is also desirably mounted on the printed circuit board 4 in advance. The protrusion 331a projecting from the positioning hole 43 may be fixed to the printed circuit board 4 by, for example, thermal welding or ultrasonic welding.

Figure 8:
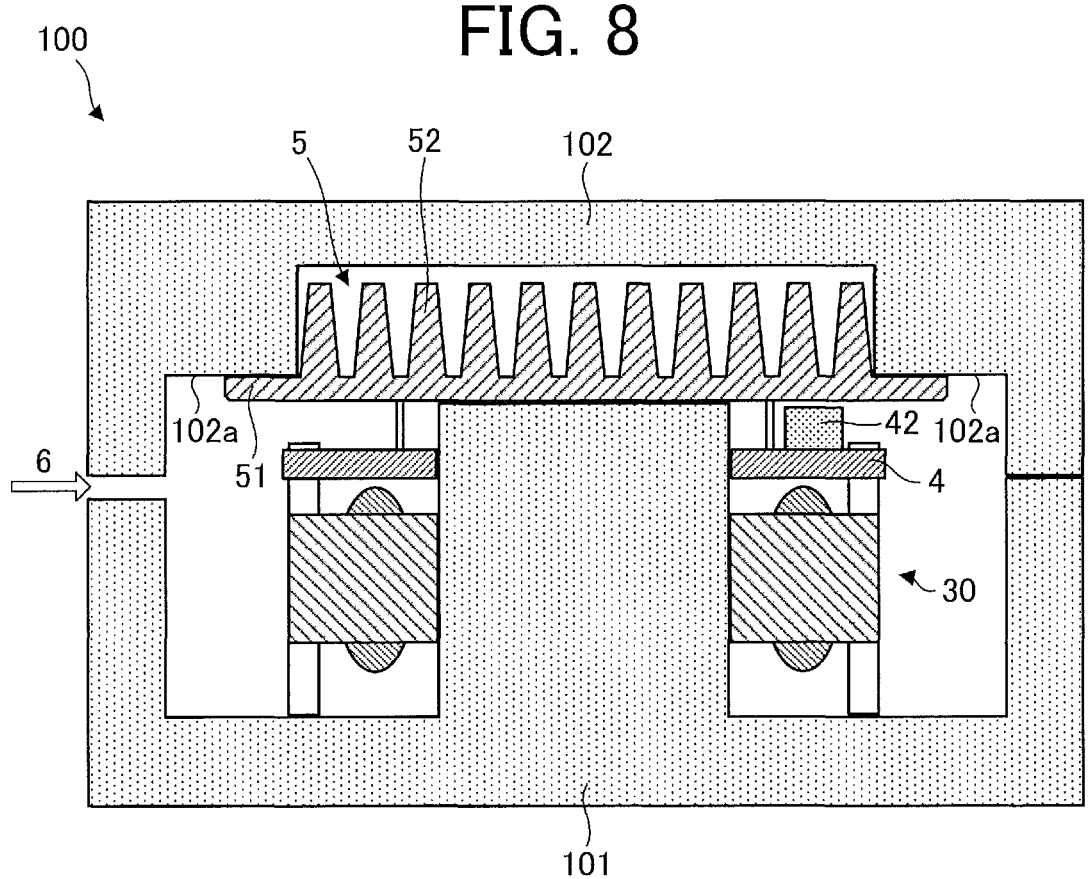
FIG. 8 is a sectional view illustrating the stator and the heat sink placed in a mold.

FIG. 8 is a sectional view illustrating the stator 30 and the heat sink 5 placed in a mold 100.

In step S2, the stator 30 and the heat sink 5 are placed in the mold 100. More specifically, the stator 30 is placed in a first mold 101 on a stationary side of the mold 100, and the heat sink 5 manufactured in advance is combined with the stator 30. A second mold 102 on a movable side of the mold 100 is combined with the first mold 101 so that an inner surface 102a of the second mold 102 comes into contact with the base portion 51 of the heat sink 5. In this case, the second mold 102 is combined with the first mold 101 so as not to form a gap between the inner surface 102a of the second mold 102 and the base portion 51.

In step S3, the resin 6 is molded. More specifically, the resin 6 is injected into the mold 100. With this operation, the base portion 51 fits into the resin 6 and the heat sink 5 is integrated with the stator 30 and the printed circuit board 4 by using the resin 6. The stator assembly 3 is thus obtained.

In step S4, the rotor 2 is manufactured. The rotor 2 is obtained by, for example, inserting the shaft 22 into a shaft hole formed in the rotor core 21. A permanent magnet for forming magnetic poles may be mounted on the rotor core 21 in advance.

In step S5, the shaft 22 is inserted into the bearings 7a and 7b.

The order of steps S1 to S5 is not limited to that illustrated in FIG. 7. For example, steps S1 to S3, and step S4 can be executed concurrently with each other. Step S4 may be executed earlier than steps S1 to S3.

In step S6, the rotor 2 is inserted inside the stator assembly 3 (more specifically, the stator 30), together with the bearings 7a and 7b.

In step S7, the bracket 8 is fitted inside the resin 6, and the waterproof rubber 9 is fitted on the shaft 22.

With the above-mentioned process, the electric motor 1 is assembled.

Modification

Figure 9A:
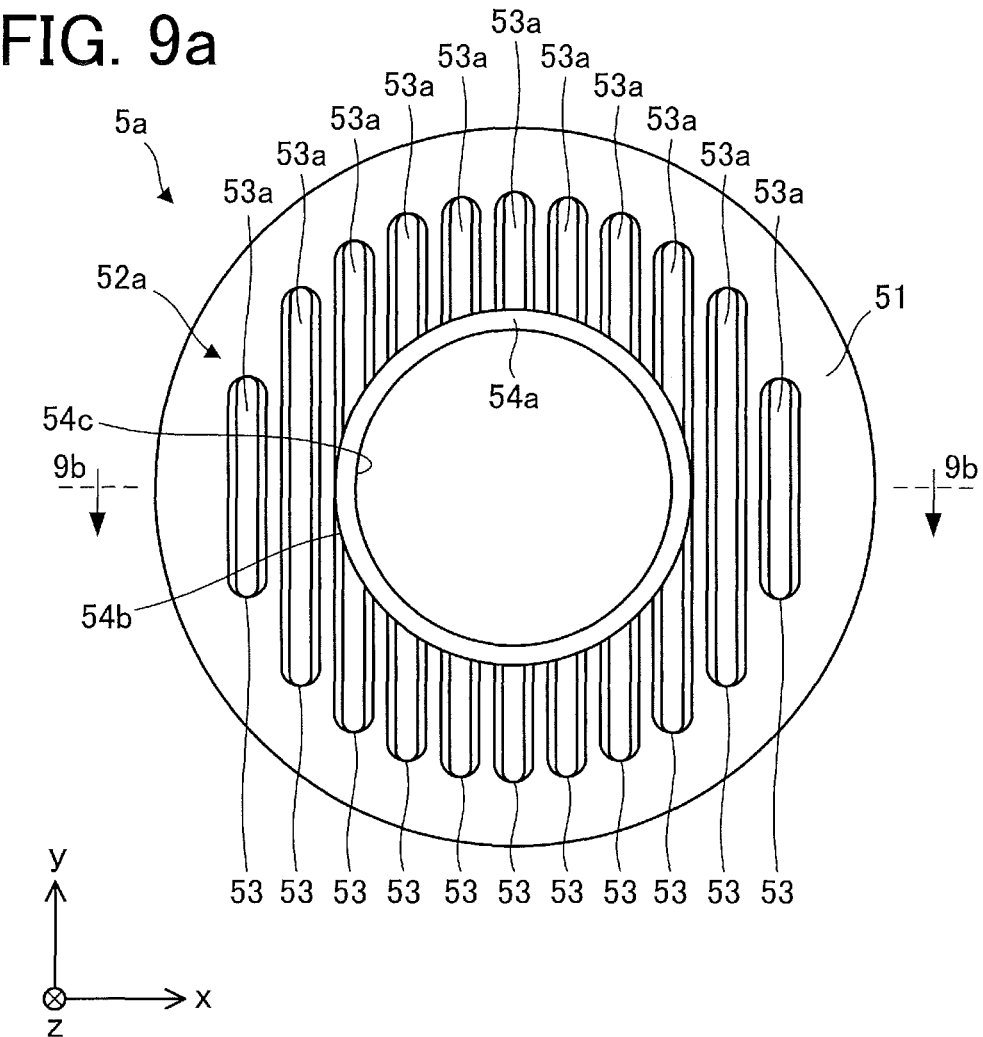
FIG. 9a is a plan view schematically illustrating another example of the heat sink.
Figure 9B:
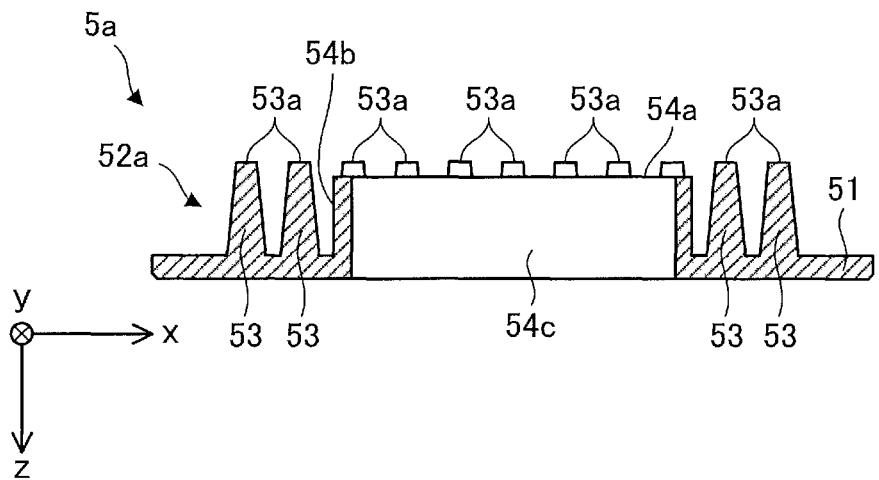

FIG. 9a is a plan view schematically illustrating another example of the heat sink 5 as a heat sink 5a, and FIG. 9b is a sectional view taken along a line 9b-9b illustrated in FIG. 9a.

In the heat sink 5a, the structure of a heat radiating portion 52a is different from that of the heat radiating portion 52 of the heat sink 5. With respect to the other part of the structure, the heat sink 5a is the same as the heat sink 5. The heat sink 5a is applicable to the electric motor 1 in place of the heat sink 5.

More specifically, the heat sink 5a includes a base portion 51 and the heat radiating portion 52a. The heat radiating portion 52a includes a plurality of fins 53, a heat radiating surface 54a (first heat radiating surface), a heat radiating surface 53a (second heat radiating surface), an outer circumferential surface 54b, and a hollow portion 54c. The hollow portion 54c passes through the base portion 51 and the heat radiating portion 52a in the axial direction. The hollow portion 54c extends in the circumferential direction, and has a width in the axial direction. The length of the hollow portion 54c in the axial direction need only be adjusted in accordance with the position of the bearing 7b.

The heat radiating surface 54a is formed opposite to the base portion 51 in the axial direction, and extends in the circumferential direction of the heat sink 5a about the axis of rotation (that is, the axis A1) of the rotor 2 (to be simply referred to as the "circumferential direction" hereinafter). The heat radiating surface 54a has a width in the radial direction.

Effects of the electric motor 1 according to Embodiment 1 (including effects of the Modification) and effects of the method for manufacturing the electric motor 1 will be described below.

With the electric motor 1 according to Embodiment 1, since the heat sink 5 is fixed to the stator assembly 3, the heat radiation efficiency of the electric motor 1 can be enhanced.

With the electric motor 1 according to Embodiment 1, furthermore, in the process of manufacturing the electric motor 1 (more specifically, step S2 in FIG. 7), the second mold 102 on the movable side of the mold 100 can be combined with the first mold 101 so that the inner surface 102a of the second mold 102 comes into contact with the base portion 51 of the heat sink 5. With this operation, in injecting the resin 6 into the mold 100 (more specifically, step S3 in FIG. 7), it is possible to prevent the resin 6 from passing through between the inner surface 102a of the second mold 102 and the base portion 51. As a result, it is possible to prevent the resin 6 from entering the heat radiating portion 52 (for example, the fins 53).

Since, therefore, a part of the heat radiating portion 52, more specifically, the plurality of fins 53 are exposed outside the electric motor 1, the heat radiation efficiency in the electric motor 1 can be enhanced.

In the Modification, since the heat radiating portion 52a includes the hollow portion 54c, the heat sink 5a can be integrated with the stator assembly 3 so that the bearing 7b is located inside the hollow portion 54c. This shortens the distance from the stator assembly 3 (for example, the printed circuit board 4 and the driving circuit 42) to the heat sink 5a, and the heat radiation efficiency in the electric motor 1 can thus be enhanced.

Embodiment 2

A heat sink 5b used for an electric motor according to Embodiment 2 will be described below.

Figure 10A:
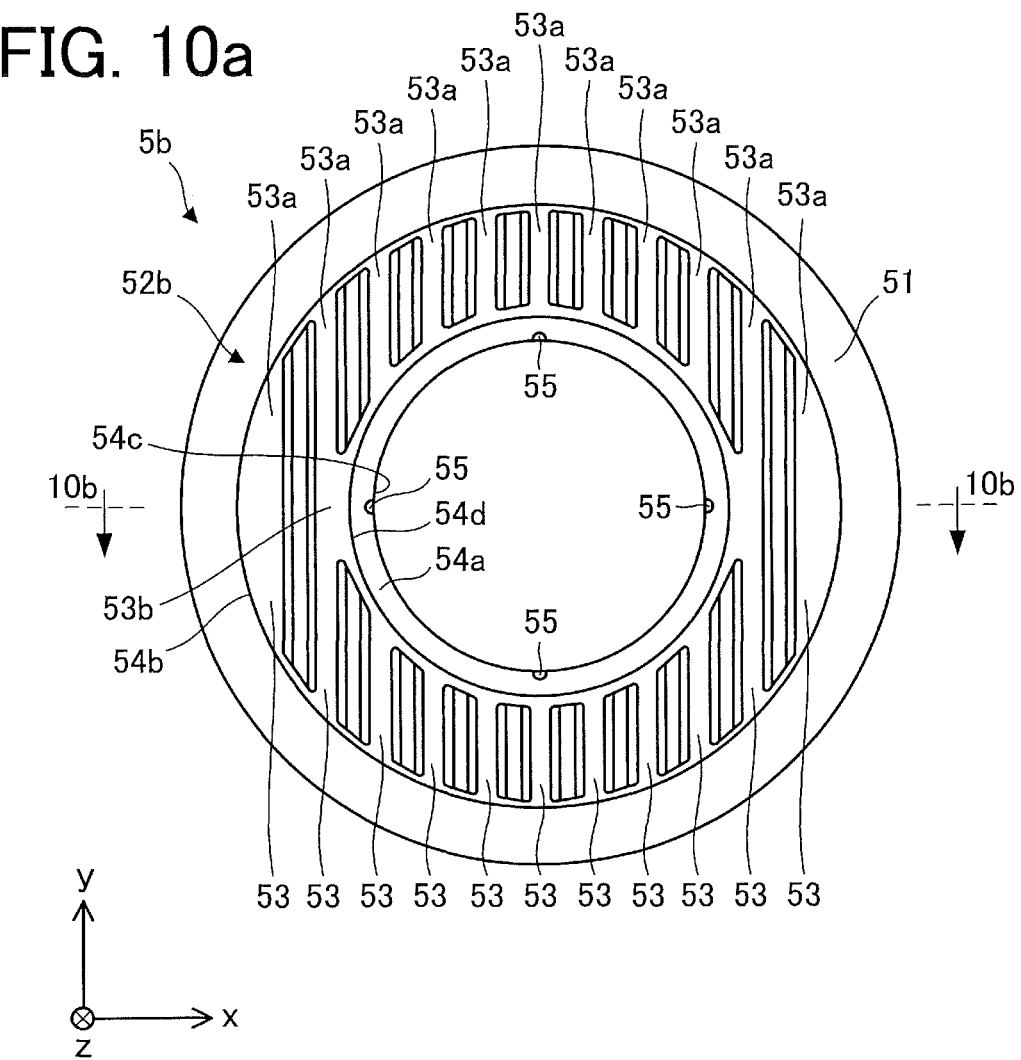
FIG. 10a is a plan view schematically illustrating a structure of a heat sink.
Figure 10B:
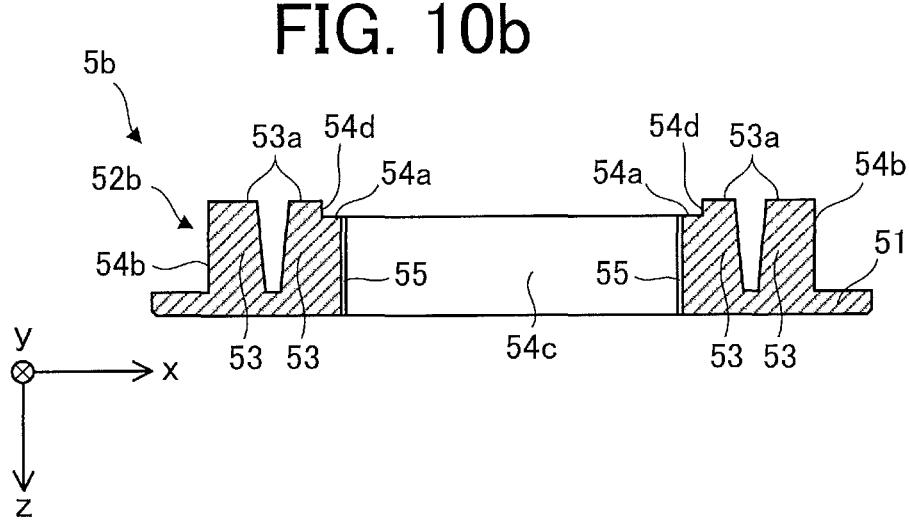

FIG. 10a is a plan view schematically illustrating a structure of the heat sink 5b, and FIG. 10b is a sectional view taken along a line 10b-10b illustrated in FIG. 10a.

In the electric motor according to Embodiment 2, the structure of the heat sink 5b is different from that of the heat sink 5 in the electric motor 1 according to Embodiment 1. Except for the heat sink 5b, the structure of the electric motor according to Embodiment 2 is the same as the structure of the electric motor 1 according to Embodiment 1.

The heat sink 5b includes a base portion 51, and a heat radiating portion 52b formed integrally with the base portion 51. The heat radiating portion 52b includes a plurality of fins 53, a heat radiating surface 54a (first heat radiating surface), a heat radiating surface 53a (second heat radiating surface), an outer circumferential surface 54b as a heat radiating wall (first wall), a hollow portion 54c, and a heat radiating wall 54d (second wall). The hollow portion 54c passes through the base portion 51 and the heat radiating portion 52b in the axial direction.

The heat radiating surface 54a is formed opposite to the base portion 51 in the axial direction, and extends in the circumferential direction. The heat sink 5b further includes at least one recess 55 for positioning the heat sink 5b. In this Embodiment, the recess 55 is formed in the heat radiating surface 54a. However, the position of the recess 55 may be other than the heat radiating surface 54a. The recess 55 is designed as, for example, a notch or a hole. In the process of manufacturing an electric motor 1, the heat sink 5b can be easily positioned relative to the stator assembly 3 by inserting a protrusion provided on the stator assembly 3 into the recess 55.

The heat radiating surface 53a forms the upper surface of each fin 53. The heat radiating surface 53a is formed outside the heat radiating surface 54a in the axial direction and the radial direction.

The outer circumferential surface 54b forms the outer surface of the heat radiating portion 52b in the circumferential direction, and is elongated in the axial direction.

The heat radiating wall 54d is formed between the heat radiating surface 54a and the heat radiating surface 53a. The heat radiating wall 54d extends in the circumferential direction, and has the width in the axial direction.

An example of a method for manufacturing the electric motor according to Embodiment 2 will be described below.

Figure 11:
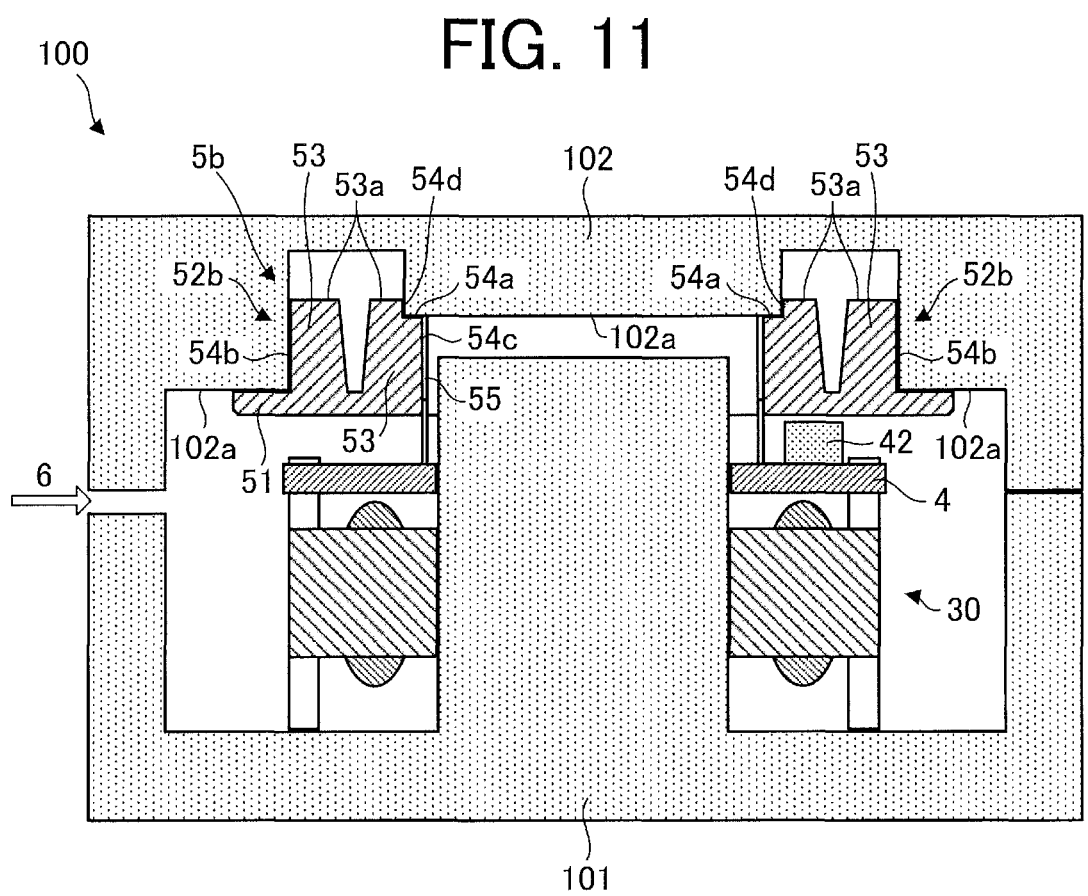
FIG. 11 is a sectional view illustrating the stator and the heat sink placed in a mold.

FIG. 11 is a sectional view illustrating a stator 30 and the heat sink 5b placed in a mold 100.

In the method for manufacturing the electric motor according to Embodiment 2, the process in step S2 illustrated in FIG. 7 is different from that in the method for manufacturing the electric motor 1 according to Embodiment 1.

More specifically, the stator 30 is placed in the first mold 101 on the stationary side of the mold 100, and the heat sink 5b manufactured in advance is combined with the stator 30. The second mold 102 on the movable side of the mold 100 is combined with the first mold 101 so that the inner surface 102a of the second mold 102 comes into contact with the base portion 51, the outer circumferential surface 54b, the heat radiating surface 54a, and the heat radiating wall 54d. In this case, the second mold 102 is combined with the first mold 101 so as not to form a gap between the inner surface 102a of the second mold 102, and the base portion 51, the outer circumferential surface 54b, the heat radiating surface 54a, and the heat radiating wall 54d.

In the method for manufacturing the electric motor according to Embodiment 2, the processes other than step S2 are the same as in the method for manufacturing the electric motor 1 according to Embodiment 1.

The electric motor according to Embodiment 2 has the same effect as that of the electric motor 1 according to Embodiment 1 (including the effect of the Modification).

The method for manufacturing the electric motor according to Embodiment 2 has the same effect as the method for manufacturing the electric motor 1 according to Embodiment 1.

With the electric motor according to Embodiment 2, furthermore, in the manufacturing process (more specifically, step S2 in FIG. 7), the second mold 102 on the movable side of the mold 100 can be combined with the first mold 101 so that the inner surface 102a of the second mold 102 comes into contact with the base portion 51, the outer circumferential surface 54b, the heat radiating surface 54a, and the heat radiating wall 54d. With this operation, in injecting the resin 6 into the mold 100 (more specifically, step S3 in FIG. 7), it is possible to prevent the resin 6 from passing through between the inner surface 102a of the second mold 102 and the base portion 51. As a result, it is possible to prevent the heat radiating portion 52b (for example, the fins 53) from being covered with the resin 6.

Even if the resin 6 passes through between the inner surface 102a of the second mold 102 and the base portion 51, since the inner surface 102a is in contact with the outer circumferential surface 54b, it is possible to prevent the heat radiating portion 52b (for example, the fins 53) from being covered with the resin 6.

In addition, since the inner surface 102a is in contact with the heat radiating surface 54a, it is possible to prevent the resin 6 flowing into the inside of the hollow portion 54c from passing through between the inner surface 102a and the heat radiating surface 54a. Even if the resin 6 passes through between the inner surface 102a and the heat radiating surface 54a, since the inner surface 102a is in contact with the heat radiating wall 54d, it is possible to prevent the heat radiating portion 52b (for example, the fins 53) from being covered with the resin 6.

Since, therefore, a part of the heat radiating portion 52b, more specifically, the plurality of fins 53 are exposed outside the electric motor according to Embodiment 2, the heat radiation efficiency in this electric motor can be enhanced.

Embodiment 3

A heat sink 5c used for an electric motor according to Embodiment 3 will be described below.

Figure 12A:
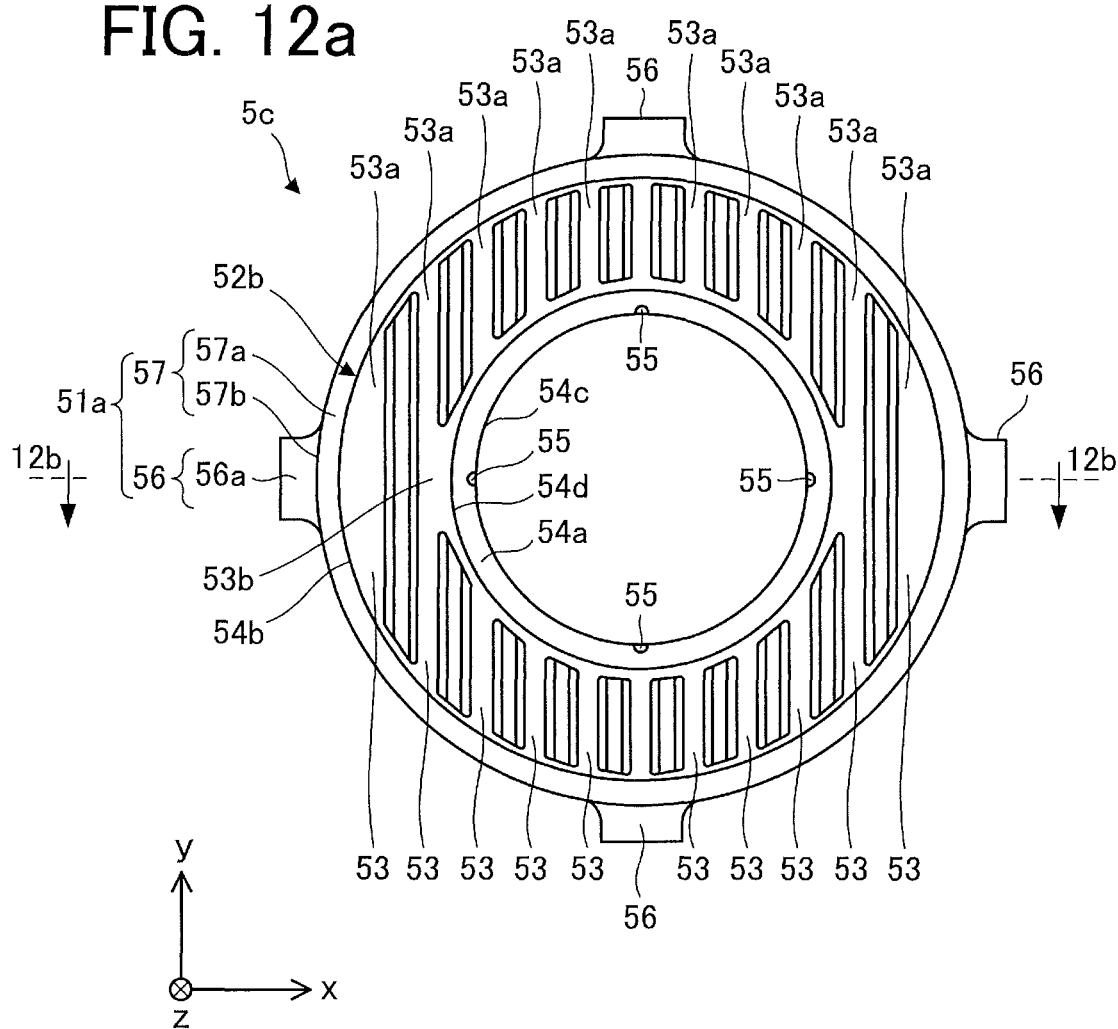
FIG. 12a is a plan view schematically illustrating a structure of a heat sink.
Figure 12B:
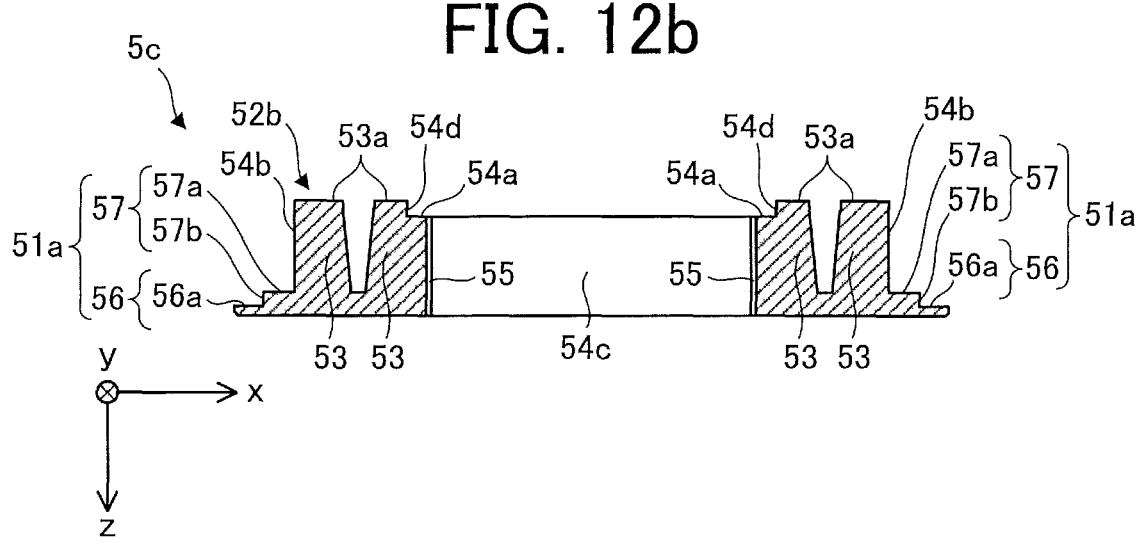

FIG. 12a is a plan view schematically illustrating a structure of the heat sink 5c, and FIG. 12b is a sectional view taken along a line 12b-12b illustrated in FIG. 12a.

In the electric motor according to Embodiment 3, the structure of the heat sink 5c is different from that of the heat sink 5 in the electric motor 1 according to Embodiment 1. Except for the heat sink 5c, the structure of the electric motor according to Embodiment 3 is the same as the structure of the electric motor 1 according to Embodiment 1. Compared to the electric motor according to Embodiment 2, the structure of a base portion 51a of the heat sink 5c is different from that of the base portion 51 of the heat sink 5b in the electric motor according to Embodiment 3.

The heat sink 5c includes the base portion 51a, and a heat radiating portion 52b formed integrally with the base portion 51a.

The base portion 51a includes at least one projecting portion 56 and a flange portion 57.

The projecting portion 56 includes a base surface 56a (first base surface) that is the upper surface of the projecting portion 56. The projecting portion 56 projects outward in the radial direction from the flange portion 57. Accordingly, the base surface 56a projects outward in the radial direction. In this Embodiment, four projecting portions 56 are formed on the heat sink 5c.

The flange portion 57 includes a base surface 57a (second base surface), and a level difference 57b (also called a base wall) elongated in the axial direction. The base surface 57a is formed outside (on the -z-side of) the base surface 56a in the axial direction, and formed inside the base surface 56a in the radial direction. In other words, the base surface 57a is located between the base surface 56a and the heat radiating surface 53a. The base surface 57a extends in the circumferential direction, and projects in the radial direction. In other words, the base surface 57a has the width in the radial direction.

The step 57b is formed between the base surface 56a and the base surface 57a. The step 57b extends in the circumferential direction. The step 57b has the width in the axial direction.

An example of a method for manufacturing the electric motor according to Embodiment 3 will be described below.

Figure 13:
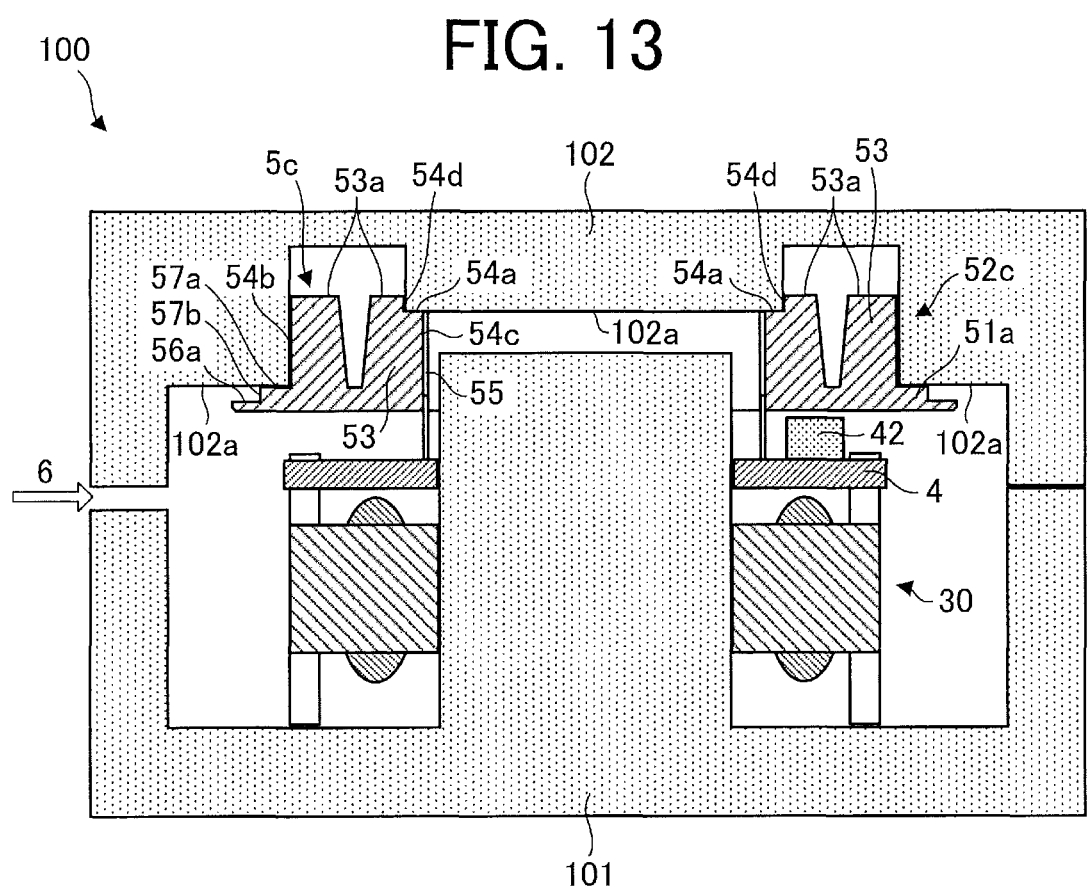
FIG. 13 is a sectional view illustrating the stator and the heat sink placed in a mold.

FIG. 13 is a sectional view illustrating a stator 30 and the heat sink 5c placed in a mold 100.

In the method for manufacturing the electric motor according to Embodiment 3, the processes in steps S2 and S3 illustrated in FIG. 7 are different from those in the method for manufacturing the electric motor 1 according to Embodiment 1.

More specifically, in step S2, the stator 30 is placed in the first mold 101 on the stationary side of the mold 100, and the heat sink 5c manufactured in advance is combined with the stator 30. The second mold 102 on the movable side of the mold 100 is combined with the first mold 101 so that the inner surface 102a of the second mold 102 comes into contact with the base surface 57a, the outer circumferential surface 54b, the heat radiating surface 54a, and the heat radiating wall 54d. In this case, the second mold 102 is combined with the first mold 101 so as not to form a space between the inner surface 102a of the second mold 102, and the base surface 57a, the outer circumferential surface 54b, the heat radiating surface 54a, and the heat radiating wall 54d. A gap is formed between the inner surface 102a and a part (more specifically, the base surface 56a) of the base portion 51a.

In step S3, the resin 6 is molded. More specifically, the resin 6 is injected into the mold 100. Still more specifically, the resin 6 is injected into the mold 100 so that the resin 6 enters the space between the inner surface 102a and a part (more specifically, the base surface 56a of the projecting portion 56) of the base portion 51a. The resin 6 is further injected into the mold 100 so that the projecting portion 56 is covered with the resin 6. With this operation, the part (more specifically, the base surface 56a of the projecting portion 56) of the base portion 51a fits into the resin 6 and the heat sink 5c is integrated with the stator 30 and a printed circuit board 4 by using the resin 6. The projecting portion 56 is covered with the resin 6. A stator assembly 3 is thus obtained.

In the method for manufacturing the electric motor according to Embodiment 3, the processes other than steps S2 and S3 are the same as in the method for manufacturing the electric motor 1 according to Embodiment 1.

The electric motor according to Embodiment 3 has the same effects as that of the electric motor 1 according to Embodiment 1 (including the effect of the Modification) and that of the electric motor according to Embodiment 2.

The method for manufacturing the electric motor according to Embodiment 3 has the same effects as those of the method for manufacturing the electric motor 1 according to Embodiment 1 and the method for manufacturing the electric motor according to Embodiment 2.

With the electric motor according to Embodiment 3, furthermore, since the projecting portion 56 is covered with the resin 6, it is possible to prevent the heat sink 5c from rotating with respect to the resin 6. In other words, a shift of the heat sink 5c in the circumferential direction with respect to the resin 6 can be prevented.

In addition, with the electric motor according to Embodiment 3, since the space between the inner surface 102a of the mold 100 and the projecting portion 56 (more specifically, the base surface 56a) is filled with the resin 6, a shift of the heat sink 5c in the axial direction with respect to the resin 6 can be prevented.

It is, therefore, possible to integrate the heat sink 5c with the stator assembly 3 without any fixing parts such as screws. Accordingly, it is possible to reduce the number of parts of the electric motor according to Embodiment 3 and the number of steps in the process of manufacturing the electric motor and to cut the cost of the electric motor.

In addition, the projecting portion 56 is formed on the base portion 51a, so that a part of the base portion 51a can be covered with the resin 6 without forming any groove in the mold 100 (more specifically, the second mold 102). It is, therefore, possible to cut the manufacturing cost of the mold 100. In addition, since the projecting portion 56 is formed on the base portion 51a, it is possible not only to obtain a portion covered with the resin 6, but also to increase the proportion of the surface area of the heat radiating portion 52b in the heat sink 5c. This makes it possible to enhance the heat radiation efficiency in the electric motor.

Embodiment 4

An air conditioner 10 according to Embodiment 4 of the present invention will be described below.

Figure 14:
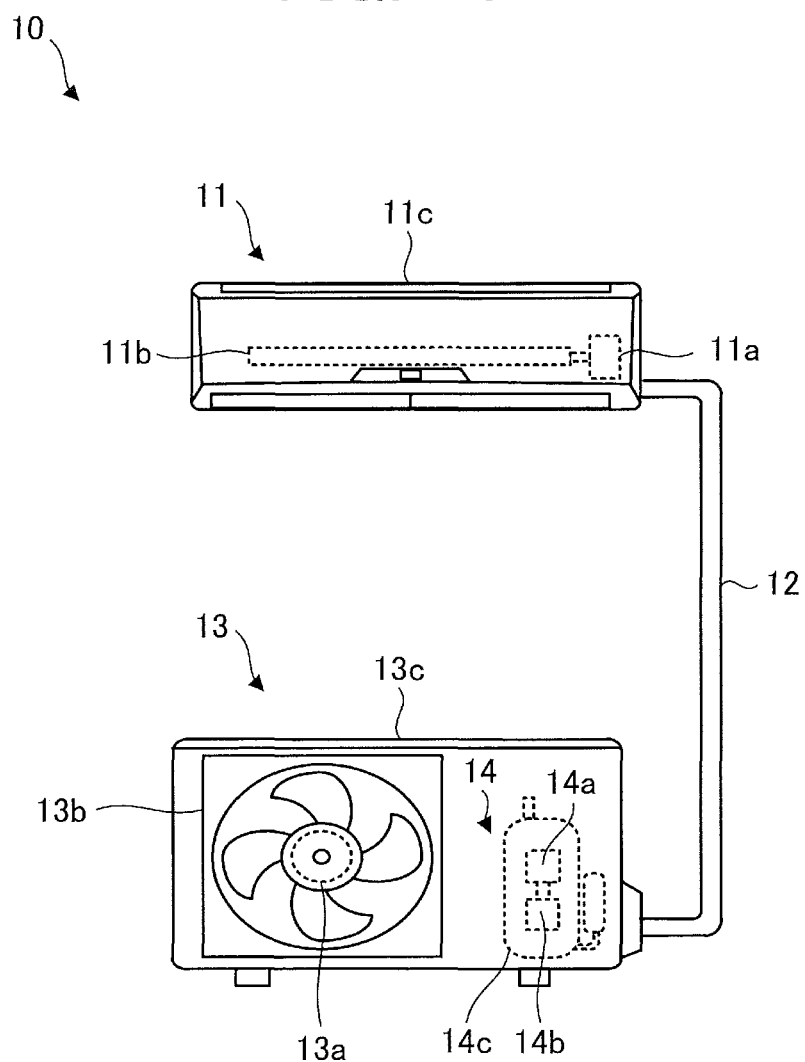
FIG. 14 is a diagram schematically illustrating a configuration of an air conditioner according to Embodiment 4 of the present invention.

FIG. 14 is a diagram schematically illustrating a configuration of the air conditioner 10 according to Embodiment 4 of the present invention.

The air conditioner 10 (for example, a refrigerating and air conditioning apparatus) according to Embodiment 4 includes an indoor unit 11 as a fan (first fan), refrigerant piping 12, and an outdoor unit 13 as a fan (second fan) connected to the indoor unit 11 via the refrigerant piping 12.

The indoor unit 11 includes an electric motor 11a (for example, the electric motor 1 according to Embodiment 1), an air blower 11b driven by the electric motor 11a to blow air, and a housing 11c covering the electric motor 11a and the air blower 11b. The air blower 11b includes, for example, blades driven by the electric motor 11a.

The outdoor unit 13 includes an electric motor 13a (for example, the electric motor 1 according to Embodiment 1), an air blower 13b, a compressor 14, and a heat exchanger (not illustrated). The air blower 13b is driven by the electric motor 13a to blow air. The air blower 13b includes, for example, blades driven by the electric motor 13a. The compressor 14 includes an electric motor 14a (for example, the electric motor 1 according to Embodiment 1), a compression mechanism 14b (for example, a refrigerant circuit) driven by the electric motor 14a, and a housing 14c covering the electric motor 14a and the compression mechanism 14b.

In the air conditioner 10, at least one of the indoor unit 11 or the outdoor unit 13 includes the electric motor described in any of Embodiments 1 to 3 (including the Modification). More specifically, as a driving source for the air blower, the electric motor described in any of Embodiments 1 to 3 is applied to at least one of the electric motors 11a or 13a. As the electric motor 14a of the compressor 14, the electric motor described in any of Embodiments 1 to 3 (including the Modification) may be used.

The air conditioner 10 can perform an operation such as a cooling operation for blowing cold air from the indoor unit 11, or a heating operation for blowing hot air from the indoor unit 11. In the indoor unit 11, the electric motor 11a serves as a driving source for driving the air blower 11b. The air blower 11b can blow conditioned air.

With the air conditioner 10 according to Embodiment 4, since the electric motor described in any of Embodiments 1 to 3 (including the Modification) is applied to at least one of the electric motors 11a or 13a, the same effect as that described in any of Embodiments 1 to 3 can be obtained. This makes it possible to prevent a failure of the air conditioner 10 due to heat generated by the electric motor. Using the electric motor described in any of Embodiments 1 to 3 in the air conditioner 10 is capable of reducing the cost of the air conditioner 10.

Using the electric motor according to any of Embodiments 1 to 3 (including the Modification) as a driving source for a fan (for example, the indoor unit 11) is capable of obtaining the same effect as that described in any of Embodiments 1 to 3. This makes it possible to prevent a failure of the fan due to heat generated by the electric motor.

Using the electric motor according to any of Embodiments 1 to 3 (including the Modification) as a driving source for the compressor 14 is capable of obtaining the same effect as that described in any of Embodiments 1 to 3. This makes it possible to prevent a failure of the compressor 14 due to heat generated by the electric motor.

The electric motor described in any of Embodiments 1 to 3 can be mounted not only in the air conditioner 10, but also in an apparatus including a driving source, such as a ventilating fan, a household electrical appliance, or a machine tool.

The features in each Embodiment and the features in the Modification described above, can be combined together as appropriate.

What is claimed is:

1. An electric motor comprising:
    a stator assembly including a resin and a stator;
    a rotor provided inside the stator assembly; and
    a heat sink fixed to the stator assembly and to radiate heat from the stator assembly, the heat sink including:
        a base portion fitting into the resin; and
        a heat radiating portion formed integrally with the base portion,
    wherein the resin is formed by
        placing the stator and the heat sink in a first mold of a mold, and
        combining a second mold of the mold with the first mold so that an inner surface of the second mold comes into contact with the base portion of the heat sink, and injecting the resin into the mold so that the base portion fits into the resin.

2. The electric motor according to claim 1, wherein the heat radiating portion includes a first heat radiating surface formed opposite to the base portion in an axial direction of the rotor, the first heat radiating surface extending in a circumferential direction about an axis of rotation of the rotor.

3. The electric motor according to claim 2, wherein the heat radiating portion further includes a first wall forming an outer surface of the heat radiating portion in the circumferential direction about the axis of rotation of the rotor, the first wall being elongated in the axial direction of the rotor.

4. The electric motor according to claim 2, wherein the heat radiating portion further includes a second heat radiating surface formed outside the first heat radiating surface in the axial direction of the rotor and a radial direction of the rotor.

5. The electric motor according to claim 4, wherein the heat radiating portion further includes a second wall formed between the first heat radiating surface and the second heat radiating surface.

6. The electric motor according to claim 1, wherein the heat radiating portion includes a hollow portion passing through the base portion and the heat radiating portion in an axial direction of the rotor.

7. The electric motor according to claim 1, wherein the base portion includes a projecting portion projecting in a radial direction of the rotor.

8. The electric motor according to claim 7, wherein the projecting portion includes a first base surface projecting outward in the radial direction of the rotor.

9. The electric motor according to claim 8, wherein the base portion includes a second base surface formed outside the first base surface in an axial direction of the rotor, the second base surface being formed inside the first base surface in the radial direction of the rotor.

10. The electric motor according to claim 9, wherein the base portion includes a level difference formed between the first base surface and the second base surface, the level difference being elongated in the axial direction of the rotor.

11. The electric motor according to claim 1, wherein the heat sink includes a recess for positioning.

12. A compressor comprising:
    the electric motor according to claim 1;
    a compression mechanism driven by the electric motor; and
    a housing covering the electric motor and the compression mechanism.

13. An air conditioner comprising:
    an indoor unit; and
    an outdoor unit connected to the indoor unit,
    at least one of the indoor unit or the outdoor unit including the electric motor according to claim 1.

14. A method for manufacturing an electric motor including a rotor, a stator, and a heat sink having a base portion and a heat radiating portion formed inside the base portion in a radial direction, the method comprising:
    manufacturing the stator;
    placing the stator and the heat sink in a first mold of a mold;
    combining a second mold of the mold with the first mold so that an inner surface of the second mold comes into contact with the base portion of the heat sink;
    injecting resin into the mold so that the base portion fits into the resin; and
    inserting the rotor inside the stator.

15. The electric motor according to claim 1, wherein the base portion extends in a circumferential direction about an axis of rotation of the rotor.

16. The method according to claim 14, wherein the base portion extends in a circumferential direction about an axis of rotation of the rotor.

* * * * *